F. G. WHITTINGTON.
AUTOMOBILE BUMPER.
APPLICATION FILED OCT. 2, 1920.
1,379,148. Patented May 24, 1921.
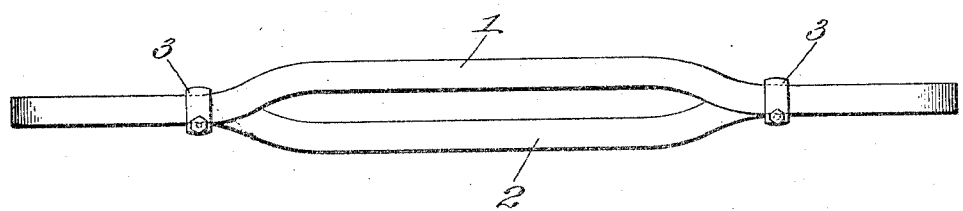
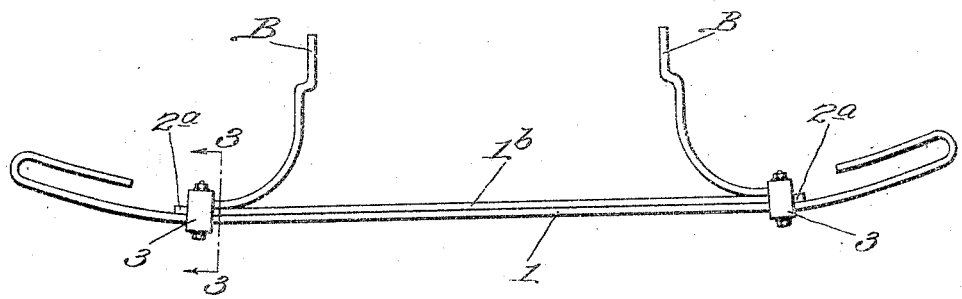
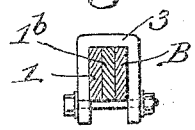
WITNESS:
P. W. Gathmann
INVENTOR
Frederik G. Whittington
BY Burton & Burton
HIS ATTORNEYS

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,379,148.　　　　Specification of Letters Patent.　　Patented May 24, 1921.

Application filed October 2, 1920. Serial No. 414,299.

*To all whom it may concern:*

Be it known that I, FREDERIK G. WHITTINGTON, a citizen of the United States, residing at the city of Chicago, in the county of Cook and the State of Illinois, have invented certain new and useful Improvements in Automobile-Bumpers, of which the following is a specification, reference being had to the accompanying drawings, forming a part thereof.

The purpose of this invention is to provide an improved construction of automobile bumper adapted to afford greater protection and to be manufactured at a lower cost than bumpers heretofore used. It consists in the elements and features of construction shown and described, as indicated in the claim.

In the drawings:

Figure 1 is a plan view and Fig. 2 is a front elevation of a bumper embodying this invention.

Fig. 3 is a section at the line, 3—3 on Fig. 1.

In the drawings the bumper shown as comprising an impact member and two spring-supporting arms therefor, said arms being adapted for attachment, in some manner not shown, to the side bars of an automobile, the mode or means of attachment forming no part of the present invention. The impact member consists of a main bar, 1, having its opposite ends reflexed rearwardly and inwardly, to form inwardly-open resilient loops, and having the middle portion of its length between these loops deflected edgewise out of alinement with the end portions, as seen as 1ᵇ. The impact member is completed by adding a supplemental impact bar 2, having its end portions lapped on the rear surface of the main impact bar, 1, just beyond the deflected portion, as seen at 2ª, and intermediately between these two end portions thus lapped, said supplemental bar is deflected edgewise in the opposite direction from the deflection of the main impact bar at 1ᵇ, so that the two deflected portions of the two bars extend parallel to each other and spaced apart, a distance approximately the width of either of said bars; though it is to be understood that there is no definite functional relation between the width of the spacing and the width of the bars, the intent being only that the total distance from the upper edge of the upper deflected part of the supplemental bar to the lower edge of the downwardly-deflected part of the main bar, shall be sufficient to cover the ordinary range of variation in the heights of various bumpers as mounted on different cars, to insure that in case of collision the collision shall be sustained by the bumper, and that one bumper should not be able to pass above or below the other to the avoidance of such collision.

The supplemental bar, 2, is secured to the main impact bar 1, by clamps, 3, 3, embracing the two bars at their lapped portions.

The impact member is carried by rearwardly-extending supporting arms, B, B, as stated, said supporting arms having their forward ends curved outwardly so as to project parallel to the impact member, and said ends are adapted to be engaged in the same clamps, 3, 3, which clamp the two bars of the impact member together, as above described.

The extent of lap of the two bars of the impact member upon each other, within which the outwardly-projected ends of the supporting arms, B, B, are lapped upon the rear lapping of said impact member bars, is designed to be sufficient to provide for any necessary variation in the lateral spread or distance apart of the two supporting arms, B, B, to accommodate the bumper to cars having their side bars, to which the bumper is attached, differently spaced apart.

I claim:

An automobile bumper comprising an impact member consisting of a flat bar having its ends reflexed rearward and inward to form inwardly open resilient loops, and its middle portion deflected edgewise to offset the said middle portion vertically from the end portions, and a supplemental bar having the middle portion of its length similarly offset edgewise from the end portions, said supplemental bar having its end portions lapped behind the portions of the main bar situated just beyond the opposite ends of the deflected portion of said main bar; supporting arms for the impact member having their forward ends bent to project transversely and present vertical faces directly forward, and clamps encompassing said transversely projecting end portions and the lapped ends of the supporting bar on the main bar of the impact member.

In testimony whereof, I have hereunto set my hand at Chicago, Illinois, this 30th day of September, 1920.

FREDERIK G. WHITTINGTON.